United States Patent [19]

Ireland et al.

[11] 4,136,906
[45] Jan. 30, 1979

[54] OPENING ROOF FOR VEHICLES

[75] Inventors: Alfred L. Ireland; Raymond B. Osborne, both of Wolverhampton, England

[73] Assignee: Edward Rose (Birmingham) Limited, England

[21] Appl. No.: 719,727

[22] Filed: Sep. 2, 1976

[51] Int. Cl.² .............................................. B60J 7/06
[52] U.S. Cl. ........................ 296/137 C; 292/DIG. 5; 296/137 H
[58] Field of Search ........... 296/137 B, 137 C, 137 D, 296/137 E, 137 H; 105/377; 292/DIG. 5, 28, 29, 251, 11, 113, 50

[56] References Cited

U.S. PATENT DOCUMENTS

| 1,835,405 | 12/1931 | Kaplan et al. | 296/137 D |
| 2,861,836 | 11/1958 | Goeggel | 296/137 C |
| 3,414,320 | 12/1968 | Heim | 296/137 E |
| 3,580,629 | 5/1971 | Heim | 296/137 E |

FOREIGN PATENT DOCUMENTS

| 734876 | 4/1943 | Fed. Rep. of Germany | 296/137 E |
| 26614 of | 1915 | United Kingdom | 296/137 H |
| 1313499 | 4/1973 | United Kingdom | 296/137 H |

*Primary Examiner*—Robert B. Reeves
*Assistant Examiner*—Michael J. Forman
*Attorney, Agent, or Firm*—Ostrolenk, Faber, Gerb & Soffen

[57] ABSTRACT

A folding roof assembly for a vehicle having a roof with an opening therein, the assembly comprising a support member extending transversely of the opening and having at its ends guides slidble in guide members mounted at opposite sides of the opening, a cover plate disposed above the support member, a flexible cover attached at one end to the cover plate and at the other end to the roof at one end of the opening, two operating devices adjacent the ends of the support member connected between the latter and the cover plate, a turnable handle mounted on the support member at a position between said devices, and two flexible drive elements such as belts operatively connecting the handle to the respective devices, the arrangement being that the support member is movable relative to the opening between a position in which the cover is extended and closes the opening, a position in which the cover is folded up and the roof is open and intermediate positions in which the roof is partially open, and the operating devices are operable by the handle through the flexible drive elements to lower the cover plate relative to the support member so that its ends engage the portions of the roof at opposite sides of the opening thereby to lock the assembly in position, and to raise the cover plate thereby to release the assembly, such movement of the cover plate being in directions solely perpendicular to the general plane of the plate. The operating devices each comprises two relatively turnable parts with cooperating cams. The guides are adjustable relative to the support member.

6 Claims, 9 Drawing Figures

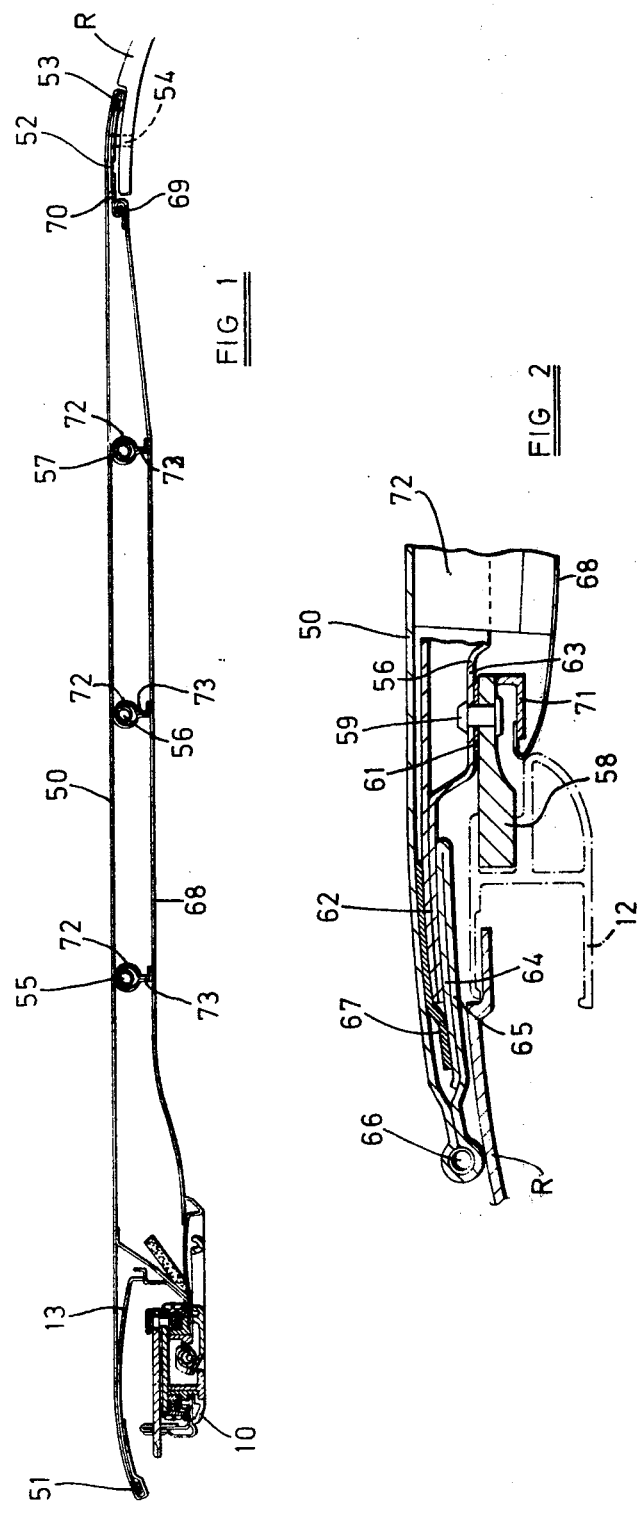

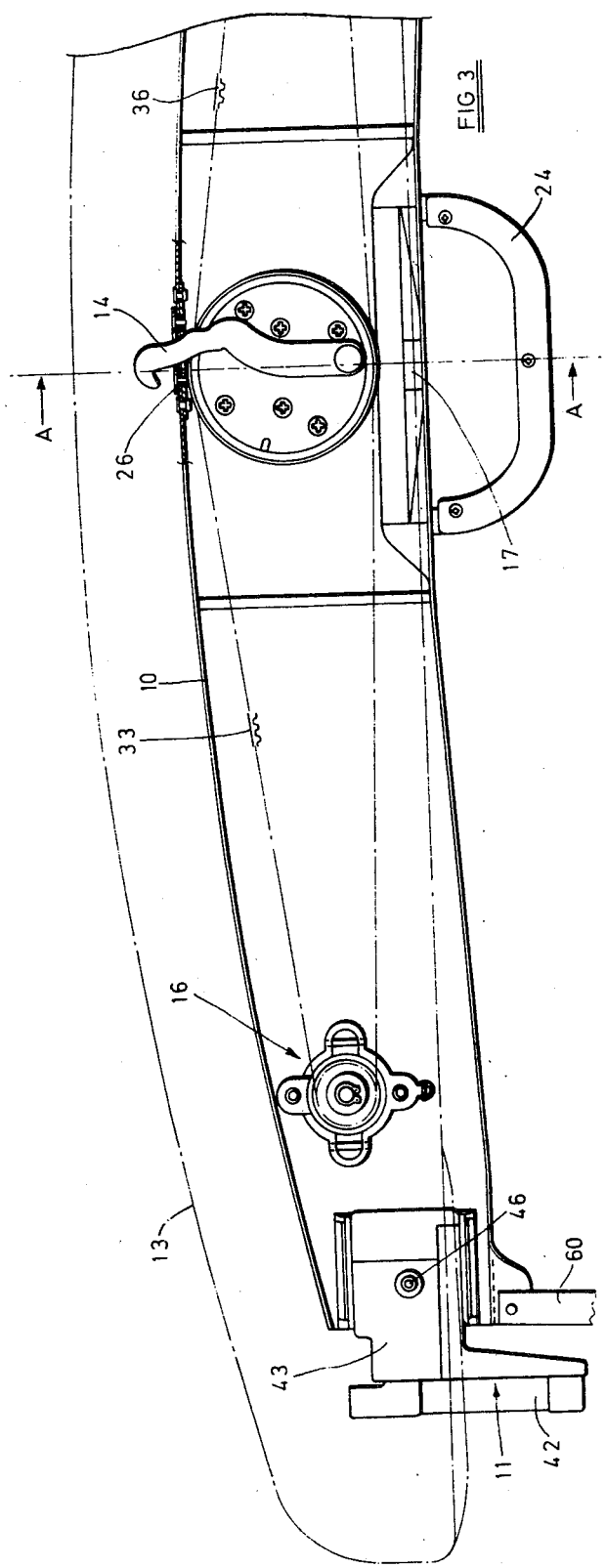

OPENING ROOF FOR VEHICLES

BACKGROUND OF THE INVENTION

1. Field of the Invention

This invention relates to opening roofs for vehicles, primarily for automobiles.

In particular, the invention is concerned with an opening roof assembly of the kind, hereinafter referred to as the kind specified, comprising a support member, an opening and closing means having a generally flat part carried by the support member, means for mounting the support member on the vehicle for movement relative to the opening between a first position in which the opening and closing means closes the opening and a second position in which the roof is open, and operating means connected between the support member and the said part of the opening and closing means and operable by actuating means to move the said part of the opening and closing means relative to the support member between a first position to lock the support member against movement between its said first and second positions, and a second position to permit such movement of the support member.

The invention has been devised primarily in connection with a folding roof assembly wherein the closure means comprises an elongate generally flat cover member disposed above the support member and a flexible or collapsible cover attached at one end thereof to the cover member and for attachment at the other end thereof to the roof at one end of the opening, the mounting means being arranged to mount the support member on the vehicle so that the support member and the cover member extend transversely of the opening in the roof and the ends of the cover member are disposed above the portions of the roof at opposite sides of the opening whereby the support member is movable longitudinally of the opening between its first position adjacent the other end of the opening in which the cover is extended and closes the opening, and its second position adjacent the said one end of the opening in which the cover is folded up or collapsed and the roof is open, the operating means being operable to move the cover member relative to the support member between its first, lowered position in which the ends of the cover member are in clamping engagement with the said portions of the roof at opposite sides of the opening to lock the support member in its first or second position or any intermediate position wherein the roof is partially open, and its second, raised position in which the ends of the cover member are released from clamping engagement with the roof to permit movement of the support member.

The invention is also applicable to a sliding roof assembly in which the opening and closing means comprises a rigid flat panel which is arranged to be mounted on the vehidle with its sides beneath the portions of the vehicle roof at opposite sides of the opening therein and for movement longitudinally of the opening, and the operating means are connected between a part of the panel and the suport member and are operable to move the panel relative to the support member between a raised position in which the sides of the panel are in sealing engagement with the said portions of the roof and the panel can be secured in an open, partially open or closed position, and a lowered position to permit movement of the panel between said positions.

In both folding and sliding roofs the actuating means for the operating means may be a handle or an electric motor.

The object of the invention is to provide various improvements in opening roofs of the kind specified.

SUMMARY OF THE INVENTION

According to a first aspect of the invention we provide an opening roof assembly of the kind specified wherein the operating means is adapted to move the said part of the opening and closing means relative to the support member between its first and second positions solely in directions perpendicular to substantially perpendicular to the general plane of the said part of the opening and closing means.

Thus, in the case of a folding roof assembly as described above, the operating means are adapted to move the cover member relative to the support member solely in directions perpendicular or substantially perpendicular to the general plane of the cover member so that when the cover member is in its second, raised position it is completely out of contact with the vehicle roof. This is in contrast to known forms of folding roof wherein the cover member is pivoted at the rear thereof to the support member so that only the leading edge of the cover member is lifted away from the roof to release the assembly and its rear edge therefore rubs against the roof on opening and closing of the assembly.

According to a second aspect of the invention we provide an opening roof assembly of the kind specified wherein the operating means are operable by the actuating means through the medium of flexible drive means.

Preferably, in the case of a folding roof assembly, the operating means comprise at least one device operatively connected between the support member and the cover member and operable to draw the cover member downwardly into clamping engagement with the vehicle roof, and the actuating means comprises a handle connected to the said device by said flexible drive means.

Preferably the handle is also connected to and arranged to operate means for locking the support member in its first position. Thus, the arrangement may be that the handle operates the said device simultaneously with the locking means whereby when the assembly is in the closed position the support member is locked by both the clamping device and the locking means but when the assembly is in the open or a partially open position it is locked solely by the said device.

Preferably there are two said devices operatively connected between the support member and the cover member adjacent the respective ends of the cover member and the locking means with the handle is disposed at a location between the two devices, usually in a central position, the handle being operatively connected to the devices through the medium of two synchronous flexible drive means.

The locking means may comprise a component mounted on the support member and turnable by the handle between an operative position and an inoperative position, and a latch member mounted on said component for pivoting relative thereto about an axis parallel to but offset from the turning axis of the component, whereby turning of the component between its operative and inoperative positions, when the assembly is installed in the vehicle, advances and retracts the latch member into and out of locking engagement with a latch plate mounted on the vehicle roof. In this case the two flexible drive means are operatively connected to said turnable component of the locking device.

According to a third aspect of the invention we provide an opening roof assembly of the kind specified wherein the operating means comprise a first part mounted for turning either on the support member or the said part of the opening and closing means but axially immovable relative thereto and having the actuating means operatively connected thereto, and a second part connected either to the said part of the opening and closing means or the support member, respectively, said parts having co-operating cam means adapted on turning of said first part in one or the other direction by the actuating means to cause relative movement between the two parts and hence movement of the said part of the opening and closing means towards or away from the support member.

The second part may be constituted by a sleeve surrounding the first part and in this event the cam means may be constituted by co-operating screw thread formations formed externally on the first part and internally on the sleeve.

Preferably, in a folding roof assembly the first part of the operating means is mounted on the support member and the second part, i.e. the sleeve, is connected to the cover member.

In an opening roof assembly embodying the second and third aspects of the invention, the flexible drive means will be operatively connected to the turntable first part of the or each device constituting the operating means. Thus, the flexible drive means of the or each device may comprise an endless toothed belt or an endless roller chain passing round toothed wheels connected to or formed integrally with the turntable components of the locking means and the device.

In an assembly embodying the third aspect of the invention, however, the actuating means may be operatively connected to the or each clamping device constituting the operating means through the medium of gears or other drive means.

Preferably in an assembly embodying the third aspect of the invention the second part of the operating means is operatively connected to the said part of the opening and closing means or the support member, as the case may be, through the medium of resilient means, e.g. one or more springs, whereby when the operating means is operated to move the said part of the opening and closing means into a locked position in which it is in clamping engagement with the vehicle roof, the resilient means compensate for any manufacturing tolerances in the roof and in the assembly itself and also for any inaccuracies in the mounting of the assembly. This arrangement also enables the clamping force between the said part of the opening and closing means, i.e. the cover member in the case of a folding roof, and the vehicle roof to be pre-set by providing resilient means of a predetermined stiffness, and also to be varied when the assembly is being installed, by substituting resilient means of a different stiffness or by varying the extent of preloading of the resilient means.

According to a fourth aspect of the invention, we provide an opening roof assembly of the kind specified wherein the mounting means comprise guides mounted on the support member at the ends thereof for sliding engagement with guide members mounted on the vehicle, the guides being adjustable relative to the support member in the longitudinal direction of the latter. Thus, the guides can be adjusted on installation and removal of the assembly to facilitate engagement and disengagement of the guides with and from the guide members and also to position the guides correctly with respect to the guide members.

BRIEF DESCRIPTION OF THE DRAWINGS

The invention will now be described by way of example with reference to the accompanying drawings, in which:

FIG. 1 is a longitudinal section through one form of folding roof assembly embodying the invention which is fitted to an automobile;

FIG. 2 is a cross section through a side part of the assembly,

FIG. 3 is a plan view of part of the opening and closing means of the assembly with its cover plate shown in chain dotted lines, FIGS. 4A, 4B and 4C together constitute a rear view, mainly in section and partly broken away, of the opening and closing means.

DESCRIPTION OF THE PREFERRED EMBODIMENTS

Figure 4A:
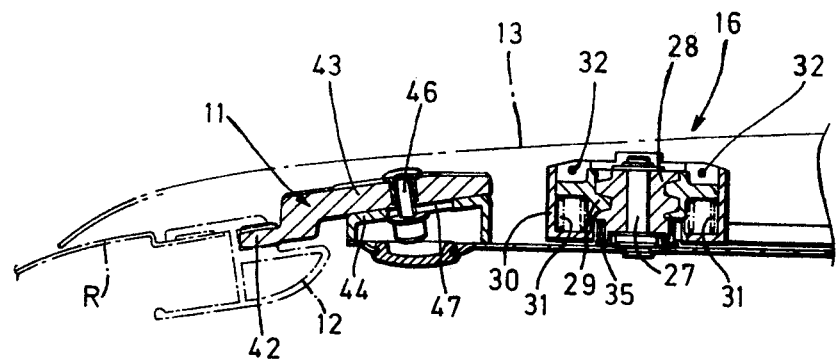
Figure 4B:
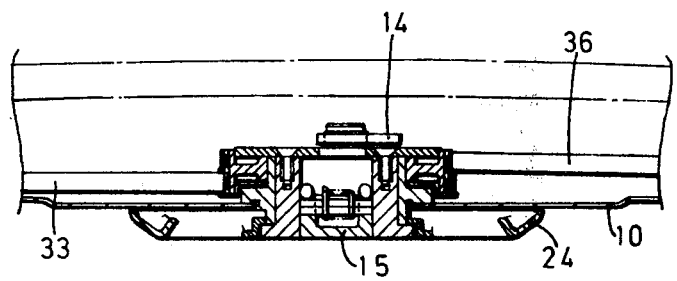
Figure 4C:
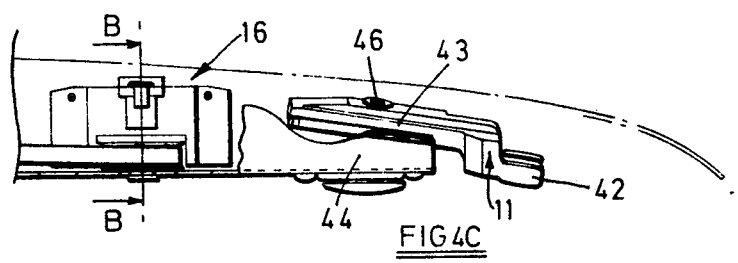

The folding roof assembly illustrated in the drawings comprises opening and closing means including an elongate support plate 10 which extends transversely of a rectangular opening formed in the roof R of the automobile and has at its respective ends two slides 11 which are slidably engaged in two channel section guide members extending along and fixed to the parallel longitudinal sides of the opening whereby the support plate is movable between a forward position and a rearward position in the opening. One of the guide members is shown in chain-dotted lines at 12 in FIGS. 2 and 4A.

A flexible outer cover 50 of a suitable sheet material, for example leather cloth coated on both sides with polyvinylchloride, is attached at its front end to an elongate generally flat cover plate 13 carried by the support plate 10 and forming part of the opening and closing means, and at its rear end to the rear end of the opening in the roof R. The front end portion of the cover 50 extends over the upper face of the cover plate 13, is turned back around a foam plastics strip 51 and extends beneath the under face of the cover plate to which it is adhered. The rear end portion of the cover 50 extends over the upper face of a transverse elongate metal panel 52, is turned back around a foam plastics strip 53 and extends beneath the under face of the panel to which it is adhered. The panel 52 has a number of spaced depending spigots 54 one of which is seen in FIG. 1 and which extend into and are fixed in bores in the roof R.

The cover 50 is supported by three tubular metal cross members 55, 56 and 57 extending transversely of the opening in the roof and parallel to the support plate 10. The member 56 (but not the members 55 and 57) is provided at its respective ends with two slides which are slideably engaged in the respective channel section guide members 12, one of the slides being shown at 58 in FIG. 2 secured by a rivet 59 to the member 56.

The cross member 55 is connected to the support plate 10 by two spring links, one of which is shown at 60 in FIG. 3, secured to the respective ends of the cross member and to the respective ends of the support plate. The cross member 57 is likewise connected to the cross member 56 by two spring links, one of which is shown at 61 in FIG. 2 held by the rivet 59 between the slide 58 and the cross member 56.

All the cross members 55, 56 and 57 have completely flattened end portions 62 joined by partially flattened portions 63 to the main tubular parts of the members, the slides 58 of the member 56 being secured to the partially flattened portions 63 of this member as shown in FIG. 2. The sides of the cover 50 extend outwardly beyond the extremities of the cross members and, as shown in FIG. 2, each side portion 64 is turned over so that it lies flat against the adjacent portion 65 and the double thickness side margin thus formed is folded over beneath the relevant flattened end portions 62 of the cross members, a piping card 66 being incorporated in the fold. Each flattened end portion 62 of each cross member is received in a pocket 67 formed by attaching a piece of a flexible material such as leathercloth coated on both sides with polyvinylchloride to the relevant double thickness side margin of the cover along two spaced parallel lines at opposite sides of the end portion 62 and a transverse line at the extremity of said portion.

The roof assembly also has an inner lining 68 of a suitable sheet material, for example fabric, which extends beneath the tubular cross members 55, 56 and 57. This lining is attached at its front end to the support plate 10 and at its rear end to the panel 52. The front end portion of the lining extends beneath a foam plastics pad (not shown) secured to the under face of the support plate 10. The rear end portion of the lining is wrapped around a transverse piping cord 69, the cord and the portion of the lining extending around it being secured in a channel of a transverse plate 70 attached to the panel 52.

The side portions of the lining 68 are each turned upwardly and wrapped around, and stitched to a nylon tape so that when the roof is closed the side portions are maintained taut, and as shown in FIG. 2, disposed close to the channel sections members 12. The slides 58 of the cross member 56 carry clips one of which is shown at 71 in FIG. 2 and which support the side portions of the lining.

The cross members 55, 56 and 57 extend through open ended tubular pockets 72. The cover 50 is attached directly to each of these pockets and the lining 68 is connected to each pocket by a flat 73 which is integral with and extends downwardly from the pocket and is attached to the lining.

The pockets 72 receiving the cross members 55, 56 and 57 and the pockets 67 receiving the flattened ends of the cross members may be produced by the methods described in co-pending United States Patent Application No. 719,726, filed Sept. 2, 1976.

The arrangement is that when the opening and closing means of the roof assembly is in its forward position with a latch member carried thereby engaged with a latch plate mounted at the front end of the opening in the roof (see below), the cross members 55, 56 and 57 are spaced from one another and the cover and the lining are stretched taut, as shown in FIG. 1, so that the cover completely closes the opening in the roof in a weather-proof fashion, the side edges of the cover being in sealing contact with the roof. When the opening and closing means is moved to its rearward position, the cross member 56 and the support plate 10 are closed up to one another and the cover 50 and the lining 68 are folded up in concertina fashion so that the roof opening is open. In the initial part of rearwards movement of the opening and closing means the spring links 60 interconnecting the support plate 10 and the adjacent cross member 55 lift the latter so that on further rearwards movement of the opening and closing means the cross member moves to a position above the member 55. The spring links 61 interconnecting the cross members 56 and 57 then lift the member 57 so that as the support plate 10 and the cross member 56 continue their rearwards movement, the member 57 is pushed to a position above the rear end of the roof opening, the member 55 also being moved to this position. Thus, when the opening and closing means is in its rearmost position, the cross member 56 is disposed adjacent to the rear end of the opening and the opening and closing means is disposed close to it, and the cross members 55 and 57 are disposed close together above the rear end of the opening.

Referring in detail to FIGS. 3 to 7, the support plate 10 of the opening and closing means is provided with a latch member 14 controlled by a handle 15 which is operable to engage the latch member with a latch plate 17 mounted at the front end of the opening in the roof R thereby to lock the opening and closing means in its forward position, and to release the latch member from the latch plate to permit the said means to be moved rearwardly.

Figure 5:
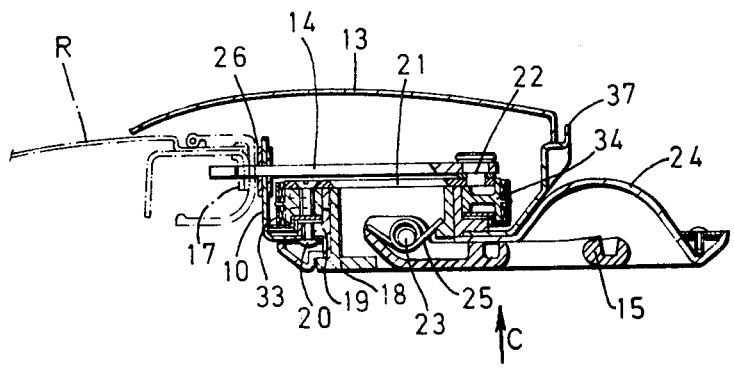
FIG. 5 is a cross-section taken on the line A—A of FIG. 3.
Figure 6:
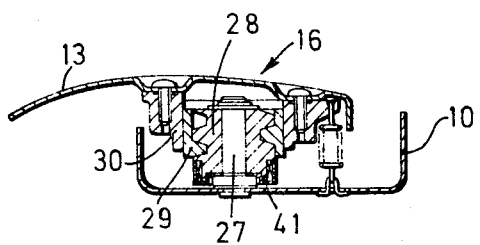
FIG. 6 is a cross-section taken on the line B—B of FIG. 4C.
Figure 7:
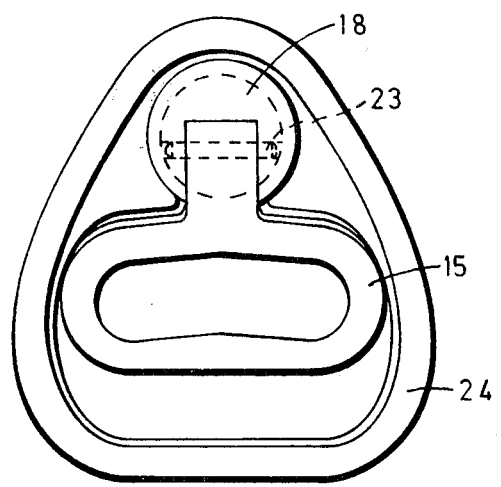
FIG. 7 is an underneath plan view of the central part of the opening and closing means taken in the direction of arrow C in FIG. 5.

The support plate 10 carries two operating means constituted by clamping devices generally designated 16 which are also operable by the handle 15 to raise and lower the cover plate 13 relative to the support plate 10 so that the handle constitutes actuating means for the clamping devices. Thus, the clamping devices 16 are operable by the handle to draw the cover plate 13 downwardly into a position in which its ends are in clamping engagement with the roof R of the vehicle at the sides of the opening therein, as shown at the left hand side of FIG. 4A, whereby the opening and closing means can be locked in its foward position (in which it is also locked by the latch member 14 and in which the front edge of the cover plate 13 is also in clamping engagement with the roof at the front of the opening therein as shown in FIG. 5), its rearward position and any intermediate position between the forward and rearward positions. When the opening and closing means is in its forward position, the rear edge of the cover plate 13 engages a reaction member 37 provided on the support plate 10 to prevent rocking of the cover plate when its front edge is brought into contact with the vehicle roof.

Referring particularly to FIG. 5, the handle 15 is carried by a hollow generally cylindrical component 18 which is mounted for turning about a vertical axis in a bearing sleeve 19 secured to the support plate 10 by rivets 20. The component 18 is provided with a disc 21 at its upper end and this disc carries a pivot pin 22 which is offset from the turning axis of the component 18 and has one end of the latch member 14 turnably mounted on it, the other end of the latch member being formed with a hook portion for engagement in an aperture in the latch plate 17 mounted on the vehicle roof at the opening therein. The handle 15 is connected to the component 18 by a horizontal pivot pin 23 about which the handle is turnable between an inoperative, out of the way position as shown in the drawings wherein it is received in a recess defined by a part 24 attached to the support plate, and an operative position in which it depends from the pivot pin 23. The handle 15 is biased by a spring 25 into its inoperative position, and when an occupant of the vehicle wishes to operate the locking mechanism he grasps the handle 15, pivots it downwardly against the action of the spring 25 into its operative position and then turns the handle and hence the component 18 through 90°. Since the pivotal connection of the latch member 14 to the disc 21 of the component 18 is offset from the turning axis of the component 18 turning of the handle in one or the other direction through 90° moves the latch member forwardly or rearwardly into or out of locking engagement with the latch plate 17, the latch member being guided in this movement by an apertured plate 26 mounted on the support plate 10. The lining 68 of the roof assembly is cut away to expose the handle 19.

The arrangement is that turning of the handle 15 also operates the clamping devices 16. Referring particularly to FIGS. 4A, 4B, 4C, and 6, each of these devices comprises a vertical stem 27 fixed to the support plate 10 and having mounted for turning thereon an externally screw-threaded component 28 the screw thread of which is engaged with an internal screw thread formed in a sleeve 29. This sleeve is disposed in a housing 30 which is axially slidable relative to the sleeve and fixed to the cover plate 13. Springs 31 are interposed between the sleeve 29 and the housing 30 to urge the housing and hence the cover plate 13 downwardly relative to the sleeve and hence to the component 28 and the support plate 10. Pegs 32 fixed to the housing 30 are arranged to abut the sleeve 29 to prevent separation of the housing and the sleeve.

The clamping devices 16 are operable by the handle 15 through the medium of two synchronous toothed belt drives. One of these drives comprises an endless toothed belt 33 which passes around a first toothed portion of a wheel 34 connected to and turnable with the handle component 18 and a smaller diameter toothed portion 35 of the component 28 of one of the clamping devices 16. The other drive comprises an endless toothed belt 36 which passes around a second toothed portion of the wheel 34 connected to the handle component 18 and a smaller diameter toothed portion 41 of the component 28 of the other clamping device 16.

The arrangement therefore is that the components 28 of the clamping devices 16 are turned through equal angular distances on turning of the handle 15 and the inter-engagement between the screw threads on the components 28 and their respective sleeves 29 moves the latter axially up or down depending upon the direction in which the handle is turned. Downwards movement of the sleeves 29 is transmitted through the springs 31 to the housings 30 and hence to the cover plate 13 whereby the latter is drawn downwardly into clamping engagement with the vehicle roof. The springs 31 compensate for any variations in the vehicle roof and any inaccuracies in the mounting of the roof assembly and ensure a close sealing enagement between the cover plate 13 and the vehicle roof. Upwards movement of the sleeves 29 raises the housings 30 and the cover plate 13 to release the latter from clamping engagement with the vehicle roof. When the cover plate is raised, there is an all-round clearance between it and the vehicle roof so that it does not rub against the vehicle roof on opening and closing of the folding roof.

The slides 11 each comprises a part 42 which is engaged in the channel of the associated guide member 12, and a part 43 which is slidable in a direction at right angles to the guide member in a channel section support 44 fixed to the relevant end of the base plate 10, the part 43 and the support having complementary outwardly inclined sides. A screw 46 passes through a slot 47 in the base of each support 44 and is received in a screw threaded bore in the part 43 of the associated slide 11. The arrangement is that with the slides 11 engaged in the channels of the guide members 12 and with the screws 46 loosened, the opening and closing means can be adjusted transversely of the opening in the vehicle roof thereby correctly to position the said means and to produce the required sliding engagement between the slides 11 and the guide members 12, the screws 46 then being tightened up. To mount the said means in position or to remove it from the vehicle, the slides 11 are simply moved to their innermost positions and then engaged with or disengaged from the guide members 12.

The arrangement of the handle 15 is such that it can be operated by the driver of the vehicle with an easy wrist action irrespective of whether the vehicle is a left or right-hand drive.

We claim:

1. In an opening roof assembly for fitting to a vehicle having a roof formed with an opening therein, the assembly comprising a support member, an opening and closing means having a part carried by the support member, means for mounting the support member on the vehicle for movement relative to the opening in the roof thereof between a first position in which the opening and closing means closes the opening and a second position in which the roof is open, and operating means connected between the support member and the said part of the opening and closing means and operable by actuating means operatively connected thereto to move the said part of the opening and closing means relative to the support member between a first position in which the said part of the opening and closing means is in clamping engagement with the vehicle roof whereby the support member is locked against movement between its said first and second positions, and a second position in which the said part of the opening and closing means is released from clamping engagement with the vehicle roof thereby to permit such movement of the support member, the improvement wherein the operating means comprises a clamping mechanism including a turnable component mounted on the support member and operable, on turning thereof, to move the said part of the opening and closing means relative to the support member between its said first and second positions, and the actuating means includes a turnable component mounted on the support member at a spacing from the clamping mechanism, and wherein an endless flexible drive element passes around the said two turnable components, the element and the components having co-operating drive formations to provide a positive drive of the operating means by the actuating means.

2. In an opening roof assembly for fitting to a vehicle having a roof formed with an opening therein, the assembly comprising a support member, an opening and closing means which comprises an elongate generally flat cover plate disposed above and carried by the support member and a collapsible cover attached at one end thereof to the cover plate and for attachment at the other end thereof to the vehicle roof at one end of the opening therein, means for mounting the support member on the vehicle with the support member and the cover plate extending transversely of the opening in the vehicle roof and the ends of the cover plate disposed above the portions of the roof at opposite sides of the opening and so that the support member is movable longitudinally of the opening between a first position in which it is disposed adjacent the other end of the opening and the cover is extended and closes the opening, and a second position in which it is disposed adjacent the said one end of the opening and the cover is collapsed and the roof is open, and operating means connected between the support member and the cover plate and operable by actuating means operatively connected thereto to move the cover plate relative to the support member between a first, lowered position in which the ends of the cover plate are in clamping engagement with the said portions of the vehicle roof at opposite sides of the opening therein thereby to lock the support member against movement relative to the opening, and a second, raised position in which the cover plate is released from clamping engagement with the vehicle roof and movement of the support member relative to the opening is permitted, the improvement wherein the operating means comprises a clamping mechanism including a turnable component mounted on the support member and operable, on turning thereof, to move the cover plate relative to the support member between its said first and second positions, and the actuating means includes a turnable component mounted on the support member at a spacing from the clamping mechanism, and wherein an endless flexible drive element passes around the said two turnable components, the element and the components having co-operating drive formations to provide a positive drive of the operating means by the actuating means.

3. An opening roof assembly as claimed in claim 2 wherein the endless flexible drive element comprises a toothed belt and the said two turnable components of the clamping mechanism and the actuating means each comprises a toothed wheel, the teeth of the belt meshing with the teeth of the wheels.

4. An opening roof assembly as claimed in claim 2 which has two said clamping mechanisms connected between the support member and the cover plate adjacent to the respective ends of the cover plate with the actuating means disposed at a location between the two mechanisms, the turnable components of the two mechanisms being drivingly connected to the turnable component of the actuating means by two said endless flexible drive elements thereby providing a synchronous drive of the clamping mechanisms by the actuating means.

5. In an opening roof assembly for fitting to a vehicle having a roof formed with an opening therein, the assembly comprising a support member, an opening and closing means which comprises an elongate generally flat cover plate disposed above and carried by the support member and a collapsible cover attached at one end thereof to the cover plate and for attachment at the other end thereof to the vehicle roof at one end of the opening therein, means for mounting the support member on the vehicle with the support member and the cover plate extending transversely of the opening in the vehicle roof and the ends of the cover plate disposed above the portions of the roof at opposite sides of the opening and so that the support member is movable longitudinally of the opening between a first position in which it is disposed adjacent the other end of the opening and the cover is extended and closes the opening, and a second position in which it is disposed adjacent the said one end of the opening and the cover is collapsed and the roof is open, and operating means connected between the support member and the cover plate and operable by actuating means operatively connected thereto to move the cover plate relative to the support member between a first, lowered position in which the ends of the cover plate are in clamping engagement with the said portions of the vehicle roof at opposite sides of the opening therein thereby to lock the support member against movement relative to the opening, and a second, raised position in which the cover plate is released from clamping engagement with the vehicle roof and movement of the support member relative to the opening is permitted, the improvement wherein the operating means comprises two components mounted respectively on the support member and the cover plate, one of said components being drivingly connected to the actuating means and being turnable by the latter relative to the other component, the said one turnable component being mounted on the support member, and the said other component being mounted on the cover plate and being constituted by a sleeve surrounding said one component, the two components being relatively axially movable and having co-operating cam formations to cause, on turning of the said one component by the actuating means, relative axial movement of the two components and hence movement of the cover plate relative to the support member between its said first and second positions, the cam formations are constituted by co-operating screw thread formations formed externally on the said one component and internally on the sleeve, and resilient means comprising springs being interposed between the sleeve and a housing which encloses the sleeve and is fixed to the cover plate, one of said components being connected to the relevant one of the support member and the cover plate through the medium of said resilient means whereby the cover plate is movable relative to the support member against the resilient action of said resilient means on movement of the cover plate into clamping engagement with the vehicle roof.

6. An opening roof assembly as claimed in claim 5 wherein the actuating means includes a turnable component mounted on the support member at a spacing from the operating means, and an endless flexible drive element passes around the said turnable component of the actuating means and the said one, turnable component of the operating means, the flexible drive element and the components having co-operating drive formations to provide a positive drive of the operating means by the actuating means.

* * * * *